Figure 1:
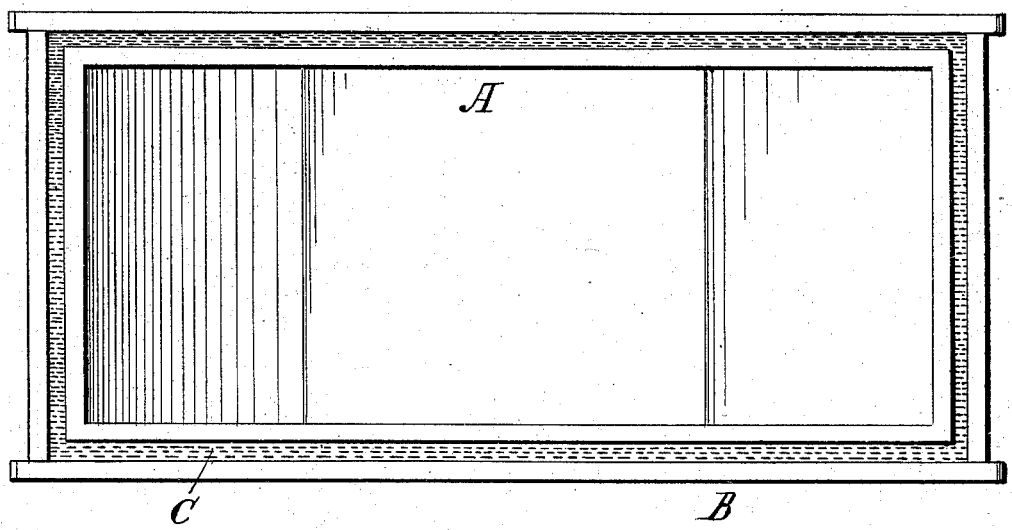

(No Model.)

J. WITHINGTON.
ACID TANK.

No. 274,241. Patented Mar. 20, 1883.

WITNESSES:

INVENTOR
James Withington
By his Attorneys,

UNITED STATES PATENT OFFICE.

JAMES WITHINGTON, OF CHAMBERSBURG, ASSIGNOR TO THE TRENTON IRON COMPANY, OF TRENTON, NEW JERSEY.

ACID-TANK.

SPECIFICATION forming part of Letters Patent No. 274,241, dated March 20, 1883.

Application filed July 27, 1882. (No model.)

*To all whom it may concern:*

Be it known that I, JAMES WITHINGTON, of Chambersburg, New Jersey, have invented an Improvement in Tanks for Use in Galvanizing and Tinning Processes, of which the following is a specification.

My invention relates to the construction of tanks, vats, or kindred receptacles for muriatic acid, dilute sulphuric acid, or such other acids as are applicable, in processes of galvanizing or tinning wire, for preparing the surface of said wire to receive the coating of zinc or tin.

Heretofore the tanks used in the process of galvanizing or tinning iron or kindred substances have been made either of solid blocks of stone hewn out to proper dimensions, or else of wood lined with sheet-lead. Incident to the stone tanks is the disadvantage that they crumble in time from the effect of the acid, while their first cost is very great, while to the lead-lined wooden tanks are incident the expense of the lining and the necessity for frequent repairs. Heretofore, also, water-proof cases have been made of two wooden boxes, one smaller than the other, both first saturated, as to their fiber, with waterproofing composition, and then placed one within the other, so as to leave an intentional interspace between all sides and the bottoms, which interspace is packed with dry plaster-of-paris, retained in place by strips of tin, iron, or wood, which close the continuous openings between the edges of the boxes. Heretofore, also, tanks employed in various processes of treating metals have been formed either of wood charred on the interior to about one-third of its thickness and soaked in melted asphaltum, so as to present to the action of the acids and chemicals a surface of charcoal and asphaltum, or else of wood lined with rubber, in turn coated with acid-proof varnish; or, again, of wood lined with glass, having an interlining of soapstone and sulphur; or, finally, of brick lined either with boards, glass, slate, or tiles. Heretofore, also, batteries for electrotyping have been constructed of wood, with an interior lining of glass and a packing of paraffine. To none of the foregoing constructions, however, do I lay any claim, as they are either imperfectly adapted for the purpose to which I put my tank or else are costly, and therefore subject to the disadvantage incident to the tanks previously used in galvanizing processes.

Generally stated, my invention consists of two wooden boxes or tanks of similar outline and general contour, and one smaller than the other, which are first placed the one within the other, so as not to touch at any point, but to leave an intentional interspace between all of the sides and between the bottoms, and which are then, as to said interspace, filled with ordinary gas-tar, bitumen, caoutchouc, or with other kindred substance or mixture which is proof against muriatic, dilute sulphuric, or kindred acids applicable in galvanizing processes, and which is poured, in liquid condition, into, so as to completely fill, the interspace, and then allowed to harden or set therein, so as to form a solid tank of said substance, which not only forms an interlining between the two wooden boxes, but serves to retain them fixedly in adherent relationship in their relative positions the one within the other, and to render the composite structure acid-proof. There is thus produced a new article of manufacture—viz., a triply-thick tank the lining of which is wood, the exterior or coating of which is wood, and the interlining of which is hardened or solidified coal-tar, or kindred acid-proof material adherent to wood.

Figure 2:
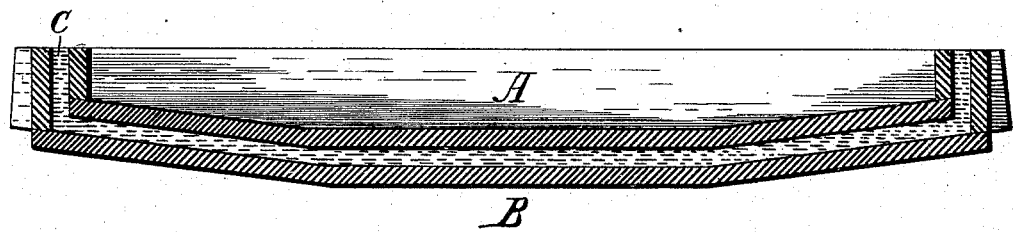

In the accompanying drawings I have represented in Figure 1 in top plan view, and in Fig. 2 in vertical longitudinal sectional elevation, a tank conveniently embodying my invention.

Similar letters of reference indicate corresponding parts.

In the drawings, A represents the inner wooden box, which is well made when of the form represented in the drawings. B is the outer box, and C is the solidified interlining. I prefer to use for the interlining ordinary gas-tar, as it can be poured into the interspace with ease while at a moderate heat, and as it rapidly sets and cools to form a rigid mass, to which the boxes both adhere.

In the construction of the boxes wooden ins are employed to unite their parts, as nails or metal pins are to be avoided by reason of the destructive effect of the acid upon them.

The advantages incident to my tank are cheapness and durability.

Having thus described my invention, I claim and desire to secure by Letters Patent—

As a new article of manufacture, a tank for use in galvanizing processes, which consists of an interior lining of wood, an intermediate layer or lining of hardened coal-tar or kindred material which is proof against muriatic or dilute sulphuric acid, and an exterior casing or envelope of wood, both the interior lining and the exterior casing being adherent to the interlining, substantially as described.

In testimony whereof I have hereunto signed my name this 18th day of July, A. D. 1882.

J. WITHINGTON.

In presence of—
  WM. HEWILL,
  C. LOUIS WHITEHEAD.